(12) United States Patent
Sauls

(10) Patent No.: US 10,040,977 B1
(45) Date of Patent: Aug. 7, 2018

(54) CONTROL PANEL RESTORATION SYSTEM AND METHOD

(71) Applicant: Don Sauls, Odessa, TX (US)

(72) Inventor: Don Sauls, Odessa, TX (US)

( * ) Notice: Subject to any disclaimer, the term of this patent is extended or adjusted under 35 U.S.C. 154(b) by 402 days.

(21) Appl. No.: 14/980,249

(22) Filed: Dec. 28, 2015

Related U.S. Application Data

(63) Continuation-in-part of application No. 13/656,371, filed on Oct. 19, 2012, now Pat. No. 9,249,341.

(51) Int. Cl.
| | |
|---|---|
| *C09J 7/29* | (2018.01) |
| *B32B 38/10* | (2006.01) |
| *B32B 43/00* | (2006.01) |
| *B60K 35/00* | (2006.01) |
| *B60H 1/00* | (2006.01) |
| *B60K 37/06* | (2006.01) |

(52) U.S. Cl.
CPC ............. *C09J 7/29* (2018.01); *B32B 38/10* (2013.01); *B32B 43/00* (2013.01); *B60H 1/00985* (2013.01); *B60K 35/00* (2013.01); *B60K 37/06* (2013.01); *B60K 2350/94* (2013.01); *C09J 2203/334* (2013.01); *C09J 2400/226* (2013.01); *C09J 2400/283* (2013.01); *C09J 2433/00* (2013.01); *C09J 2463/00* (2013.01); *C09J 2475/00* (2013.01); *Y10T 428/24802* (2015.01); *Y10T 428/24934* (2015.01)

(58) Field of Classification Search
None
See application file for complete search history.

(56) References Cited

U.S. PATENT DOCUMENTS

| | | |
|---|---|---|
| 5,660,925 A | 8/1997 | Cooley et al. |
| 6,196,738 B1 | 3/2001 | Shimizu et al. |
| 2002/0172354 A1 | 11/2002 | Nishi |

*Primary Examiner* — Gerard T Higgins
(74) *Attorney, Agent, or Firm* — Buskop Law Group, P.C.; Wendy Buskop

(57) ABSTRACT

A restoration method for producing a restored vehicle. As marked identifiers fade after extended use, users are left without means to readily determine the functions of vehicle controllers. The restoration method is comprised of scraping an indicia from a vehicle controller. The restoration method is also comprised of removing debris from a label-receiving surface of the vehicle controller and smoothing the label-receiving surface. The restoration method is further comprised of aligning a restoration apparatus with the label-receiving surface and securing the restoration apparatus to the vehicle controller. The restoration apparatus includes a sheet of material, an adhesive disposed on a side of the sheet of material, and an identifier formed on an opposite of the sheet of material. The restoration apparatus forms a restored controller of the restored vehicle that is uniform and continuous in appearance and indistinguishable in appearance from the original automobile manufacturer identifiers.

5 Claims, 4 Drawing Sheets

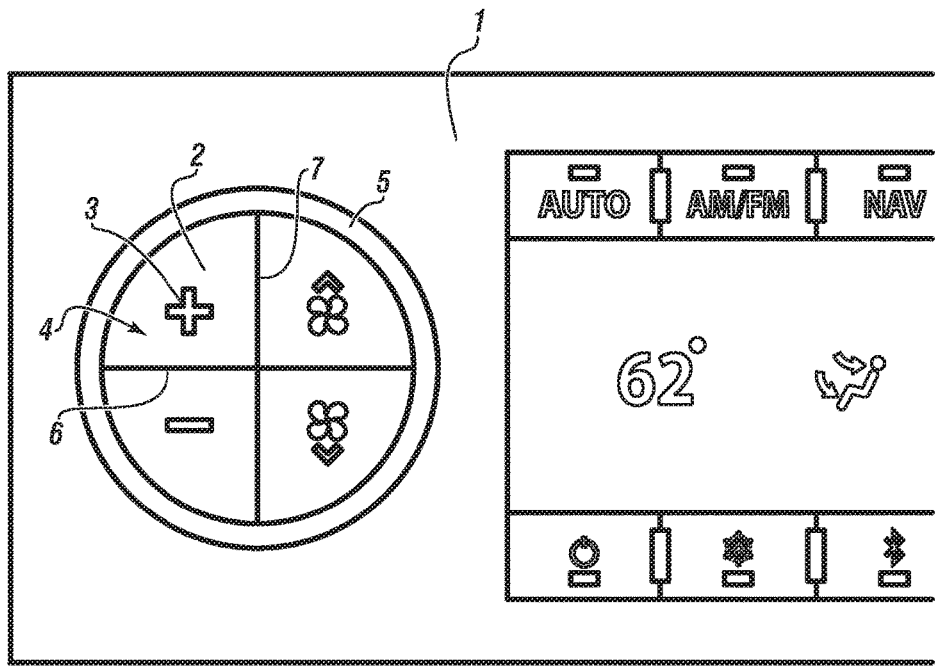
*FIGURE 1*
*FIGURE 2*
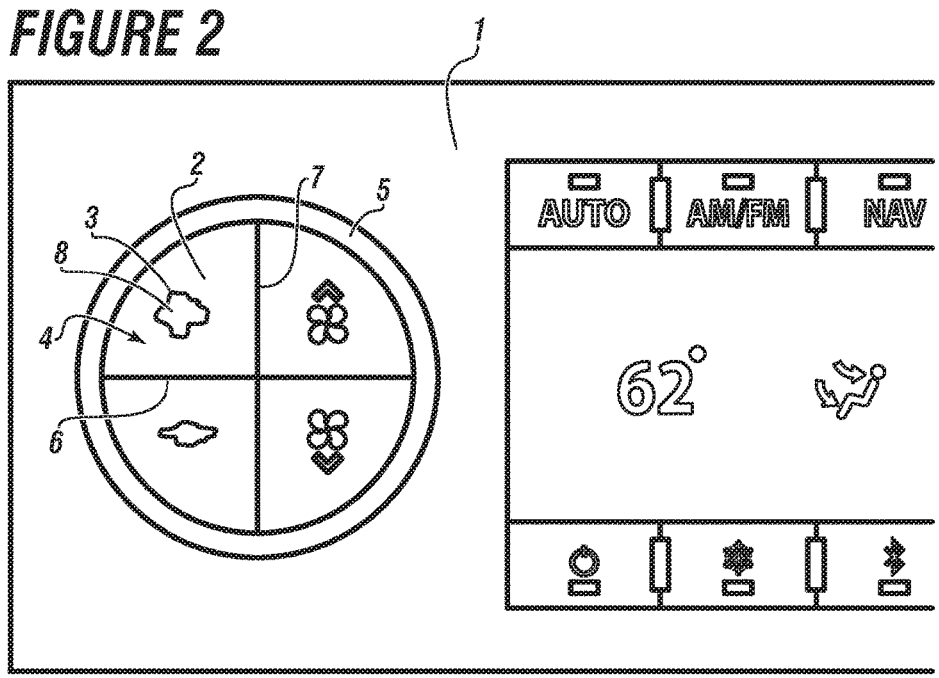

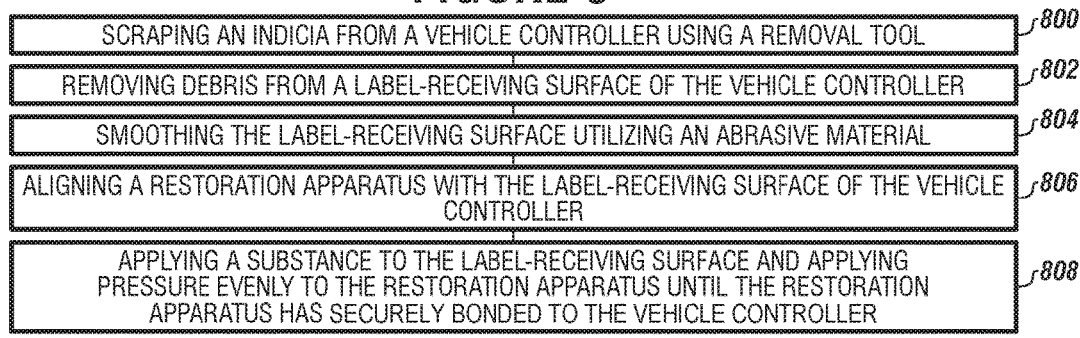

CONTROL PANEL RESTORATION SYSTEM AND METHOD

CROSS REFERENCE TO RELATED APPLICATION

The current application is a Continuation in Part and claims priority to co-pending application Ser. No. 13/656,371 filed on Oct. 19, 2012, entitled "CONTROL PANEL RESTORATION SYSTEM AND METHOD." This reference is incorporated herein in its entirety.

FIELD

The present embodiments generally relate to a method of applying a restoration system comprised of an adhesive, a sheet of material, and a marking on the sheet of material.

BACKGROUND

Conventional motor vehicles have a number of different types of controllers for various functions such as climate control, defroster activation, air flow mode control and others. The controllers allow users to adjust the temperature, fan, and the seat position among other things.

When controllers are pressed down, or turned depressed, the corresponding function is activated.

In order to identify different functions of the controllers, automobile manufacturers generally mark or label controllers with symbols, numbers, or icons. These identifiers clearly indicate to users the function that each controller serves. The identifiers are generally marked with color and/or an appropriate icon depending on the controller's function. For example, heating controllers are generally marked red while cooling or air conditioning controllers are marked blue.

After extended use, the marked identifiers can become dilapidated, faded or potentially even completely worn off. As the identifiers fade, users are left without means to readily determine the functions of the controllers as well as an aesthetically unpleasant view of the control panel or the vehicle controller.

Additionally, the light source behind the faded controller can also produce an uneven and unsafe illumination that can distract the vehicle operator. Lotions, oil, and body secretions on hands of users also contribute to fading and disappearance of identifiers.

Controllers that are used in a highly repetitive manner and exposed to high temperatures are also subject to fading as well as wear and tear.

To address this problem, users can request the automobile dealers or repair shops to replace the controllers. However, this process can be inefficient and expensive because often times, the entire control panel must be replaced. In addition, faded identifiers are not aesthetically pleasing and discourage purchasers of used automobiles. Used automobile buyers often incorrectly associate additional, more severe automotive issues with faded control panels.

As an alternative, manufacturers have made controllers with protruding identifiers that are slightly raised from the controller's surface. However, these controllers can be costly to manufacture. If the protruding identifiers are made of different material from the controllers, the identifiers will eventually separate from buttons over time due to wear and tear.

This is also not aesthetically pleasing and also can be costly to repair.

Some repair shops or automobile dealers attempt to solve the problem by repainting the identifiers. However this process is time consuming and not satisfactory due to potential smudging of the paint. Other repair specialists or auto detailers provide stickers with characters or symbols to replace the faded portion of the controllers.

These individual labels are very complicated to use and can produce unsatisfactory results. For example, a user would be required to first locate and then remove the individual letters for the word heat (H, E, A, and T) from a large list of stickers. The user would then have to place the individual letters on the controllers, taking extra care to space and align the letters properly.

In the case of an icon or symbol, the user would have to align the icon or symbol perfectly to avoid detection of the replacement label as an after-market device. In other prior art systems, the user would select a label from a large selection using transfer tape. The individual characters would be peeled away from the back of the label with a gripping tool. Transfer tape would be used again to apply the label to the controller. A heating element would be used to secure the placement of the new controller label.

Accordingly, the present invention overcomes the problems and disadvantages of the prior art. It is a restoration method utilizing an apparatus that can be applied to the various surfaces on the interior of automobiles. The present system is an improvement over prior art and is more efficient, aesthetically appealing, and inexpensive. The present restoration method practically eliminates chances for error or misalignment. It is also difficult to detect as an after-market device.

BRIEF DESCRIPTION OF THE DRAWINGS

The detailed description will be better understood in conjunction with the accompanying drawings as follows:

FIG. 1 depicts an embodiment of a vehicle controller.

FIG. 2 depicts an embodiment of the vehicle controller with faded identifiers.

FIG. 8 depicts the steps of the method restoring a vehicle controller.

Figure 3:
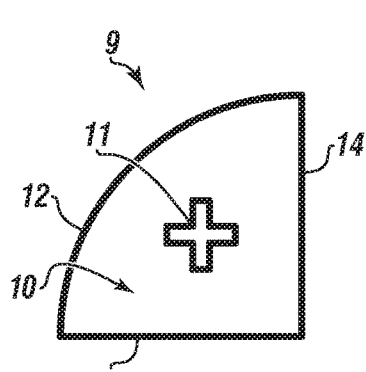
FIG. 3 shows a front view of a restoration label.

The present embodiments are detailed below with reference to the listed Figures.

DETAILED DESCRIPTION OF THE EMBODIMENTS

Before explaining the present system and method in detail, it is to be understood that the system and method are not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

The present system is a method of applying a restoration system comprised of an adhesive, a sheet of material, and a marking on the sheet of material. The present method is novel in that the vehicle controller, often referred to as a "control head", does not require removal or disconnection from the vehicle prior to, or during restoration.

Removal of the vehicle controller often requires reprogramming, readjustment, or resetting of the vehicle controller, which adds expense and time for currently used methods.

The dimensions of the controller define the perimeter of the label or overlay. Therefore the label-receiving area on the controller and the restoration label can have the same shape. When the controller has gaps between the controller and the panel, the restoration label's boundaries can be aligned with the boundaries of the gap.

This creates a uniform and continuous appearance that is not easily detected as an after-market addition to the automobile. Other technical features can be readily apparent to one skilled in the art from the following figures and descriptions.

The label system restores the original look of the control buttons. The labels are generally made of material that imitates the appearance of the controllers. For example, if the controller is made of black plastic, the material would appear glossy and black, virtually identical to the original controller. The material of the label can vary depending on what the controller is made of. The shape and color of the replacement label is defined by the original shape and color of the controller. The material can be paper, plastic, vinyl or any similar material.

Generally, the identifiers on the controller and the replacement label can look identical. The identifier on the label is in the same position as the identifier on the controller.

In order for the label to bond to the controller, an adhesive is on the opposite side of the material with the identifier. A number of various types of adhesive can be added to increase the bonding depending on the material. Ideally, adhesive that bonds strongly and tightly yet resists damage from light, temperature and humidity are appropriate.

Adhesives such as epoxy, cyanoacrylates, or any similar substance can serve the same purpose. Alternatively, the user can add the adhesive to the controller's surface instead of the label.

Before affixing the label, original identifiers must be removed to increase bonding and to create a smoother surface for the label to attach to. This removal process can be done by different methods according to the materials of the identifiers.

For instance, for identifiers created by paint, a user can use a dull knife or sculpting knife. The user carefully removes the identifier by scratching any remaining identifier from the surface of the controller. For raised identifiers with any portion removed or hanging loose, the user can remove remaining portion of the identifier with sandpaper or a similar tool.

Any remaining portion can be removed by scratching with a dull knife or a sculpting knife. The user can scratch the surface area with sand paper to remove final remnants of identifiers and to create slightly rough textured surface to increase bonding strength of adhesive. These steps create a smooth and even label-receiving surface area for the controllers.

If any portion of the original controller identifier remains, its outline can be visible through the newly placed label. The user can clean the controller to remove any particles or debris before affixing the label to the controller. Users can use an alcohol based solution to clean the surface of the controller. An alcohol based cleanser can allow the user to manipulate and adjust the label freely before the adhesive on the label securely bonds to the controller. While not required, users can find the use of an alcohol based cleanser or other cleaning solution such as soap and water to aid in the placement of the label.

Once the label is positioned appropriately, the alcohol based cleanser will evaporate leaving the label securely bonded to the controller. Users can also use other fluids to cleanse the surface of the controller, such as window cleaner or any similar cleaning fluid. However, in the case of the non-alcohol based cleansers, the user will need to take care to position the label properly initially.

In affixing the label, the user can utilize various devices such as tweezers, fingers, or any other gripping tool. The user aligns the label's boundaries with the controller's boundaries and carefully applies it to the surface of the controller. After the label is attached, the user can apply pressure to remove any air bubble and to secure the label in its proper location.

In instances, the user can find it beneficial to use a label that is slightly smaller than the original in order to aid in placement and manipulation of the label. In embodiments, a marker or other touch up tool can be used on and near the edges of the label to disguise the smaller size.

Turning now to the Figures, referring generally to FIGS. 1-7, the restoration method is designed to restore the original appearance of the control panel with new identifiers for worn out controllers.

The restoration system is composed of a sheet of material 10, a marked identifier 11, and adhesive. The sheet of material 10 or the front side of the label can be made of material that looks similar to the material of the controllers 2. The identifier 11 can also be marked on the front of a label 9. The back of the label 15 includes a means to affix the label 9 to the controller 2.

The restoration method includes removing the faded identifier 8 from the controller 2, smoothening and scratching the surface area of the controller 2, removing the debris, affixing the label 9, and applying pressure to secure the label 9.

A vehicle controller 1 includes various controllers. For example buttons, knobs, and switches. A controller 2, such as a temperature controller, often includes an identifier 3 that looks like a plus sign indicating its function (e.g. for increasing). The identifier 3 placed on the surface area 4 of the controller can be different depending on the automobile.

Figure 4:
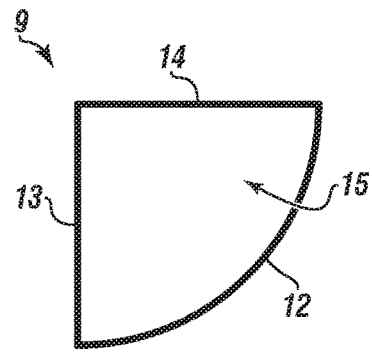
FIG. 4 shows a back view of the restoration label.

The surface area 4 defines the perimeter for the label in FIG. 4. In this embodiment, the controller has an outer boundary 5, an inner horizontal boundary 6 and an inner vertical boundary 7, aligning with the label in FIG. 3.

The restoration method involves carefully aligning the outer boundary 5 of the controller with the outer boundary 12 of the label, the inner horizontal boundary 6 of the controller with the inner horizontal boundary 13 of the label, and the inner vertical boundary 7 of the controller with the inner vertical boundary 14 of the label.

FIG. 1 depicts an embodiment of a vehicle controller.

The vehicle controller 1 is shown with multiple controllers. The controller 2 is shown as a temperature controller in this Figure.

The controller 2 has a surface area 4, which has an identifier 3, shown here as a plus sign.

Each controller 2 can have an outer boundary 5, an inner horizontal boundary 6 and an inner vertical boundary 7. In embodiments, the boundaries can vary depending upon the control shape and size and application.

FIG. 2 is the view of automobile controller with faded identifiers. A vehicle controller 1 can include various controllers, such as buttons, knobs, and switches. The controllers normally have identifiers to indicate that controllers function, such as increase or decrease. A controller 2, such as a temperature controller often includes an identifier 3 that looks like a plus sign indicating its function (e.g. for increasing).

After repetitive use, the identifier 3 fades and eventually wears off creating a faded identifier 8 and users cannot readily identify the function of the controller 2. The surface area 4 defines the perimeter of the label in FIG. 4.

In this embodiment, the controller has an outer boundary 5, an inner horizontal boundary 6 and an inner vertical boundary 7, aligning with the label in FIG. 3.

FIG. 3 is a front view of the label 9. The front view of the label includes a marked identifier 11 on the sheet of material 10 or the front side of the label 9. The label includes an outer boundary 12, an inner horizontal boundary 13 and an inner vertical boundary 14. The perimeter for the label 9 matches with the perimeter of the controller.

When the label 9 is affixed to the surface area of the controller, the outer and inner boundaries of the label align with the outer and inner boundaries of the controller.

The restoration system involves aligning the outer boundary 5 of the controller with the outer boundary 12 of the label 9, the inner horizontal boundary 6 of the controller with the inner horizontal boundary 13 of the label, and the inner vertical boundary 7 of the controller with the inner vertical boundary 14 of the label.

The identifier 11 marked on the label 9 is identical with the identifier 3 marked on the controller 4 in its shape, size and color. The surface area of the label can be made of materials that create a visually similar look of the material of the controller. For example, if the controller is made of black plastic, the surface area of the label can be made of materials, such as paper, plastic, or vinyl, that appear black and glossy to mimic the look of the original controller.

FIG. 4 is a back view of the label 9. The back view of the label includes the outer boundary 12, the inner horizontal boundary 13 and an inner vertical boundary 14. An adhesive can be applied to the back of the label 15, the opposite side from the marked identifier as a means to affix the label 9 to the controller.

Alternatively, the adhesive can be added to the surface area of the controller for the attachment of label 9. The adhesive can vary depending on the material of the label 9.

Figure 5:
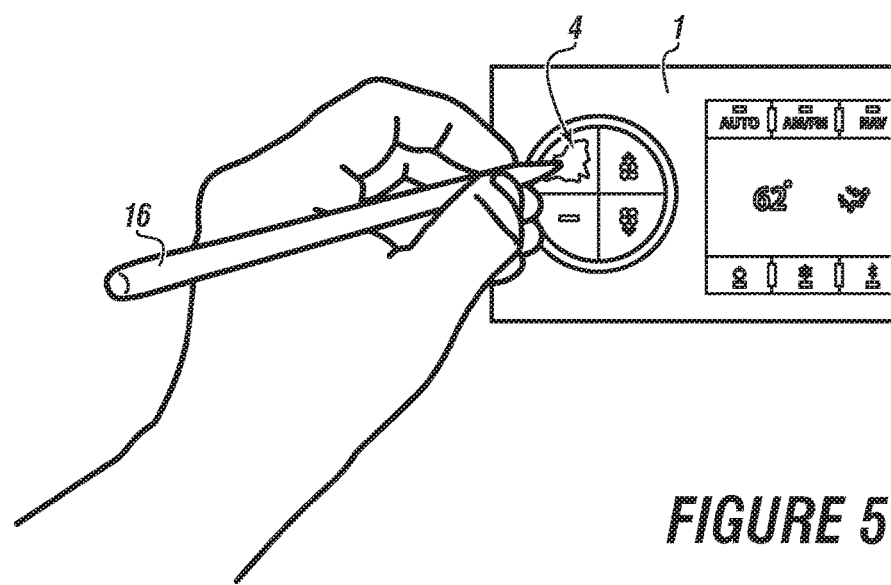
FIG. 5 shows a view of a user removing a faded identifier.

FIG. 5 is a view of the user removing a damaged identifier.

Users can utilize a removal tool 16 on the controller's surface area 4 on the vehicle controller 1. Before applying the label to the surface area 4, the faded identifier needs to be completely removed to create an even surface area. A removal tool 16 such as a sculpting or scraping tool 16, such as a utility knife, can be used to scratch the remainder of the faded identifier. Other tools such as scissors or a dull knife can be used.

The original portion of the faded identifier is scratched off to create a smooth surface area. In addition, the user can sand the entire surface area 4 to create a slightly textured surface for better bonding of the label. After the scratching and smoothening, the user can clean the surface area 4 of the controller and remove any debris.

Figure 6:
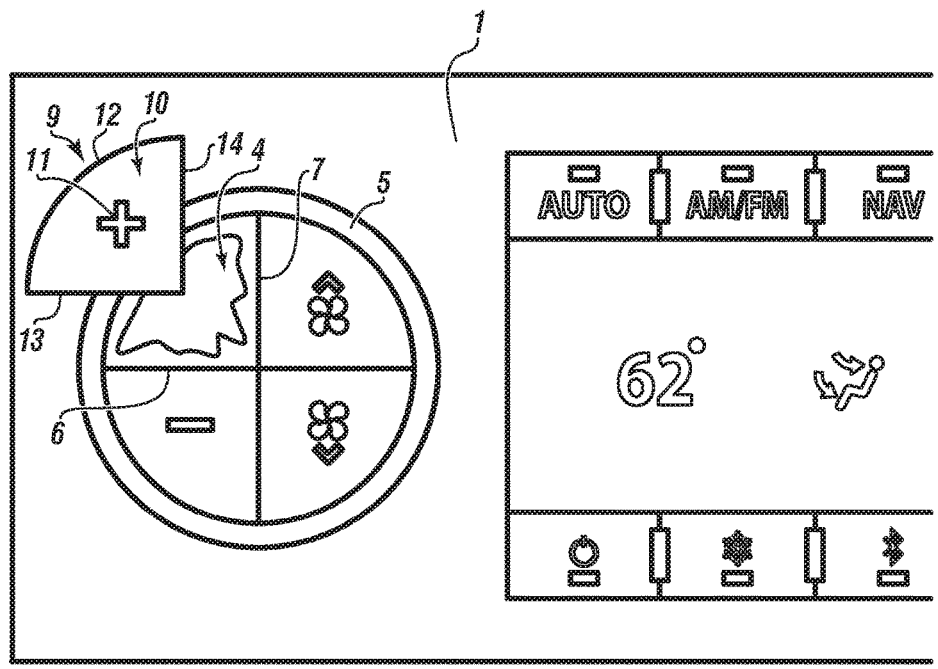
FIG. 6 shows a view of the installation of a new label on a vehicle controller.

FIG. 6 is a view of the installation of a new label on a controller. The vehicle controller 1 can include various controllers. A label 9 with an identifier 11 is affixed to the surface area 4 of the controller. The outer boundary 12 of the label, the inner horizontal boundary 13 of the label and the inner vertical boundary 14 the label are aligned with the outer boundary 5 of the controller, the inner horizontal boundary 6 of the controller, and the inner vertical boundary 7 of the controller and carefully affixed.

An adhesive can be added to the sheet of material 10 or can be added to the surface area of the controller. In attaching the label, tools such as tweezers or fingers can be used. After the label is affixed, pressure can be added to remove any air bubbles between the surface area of the controller and the label.

Figure 7:
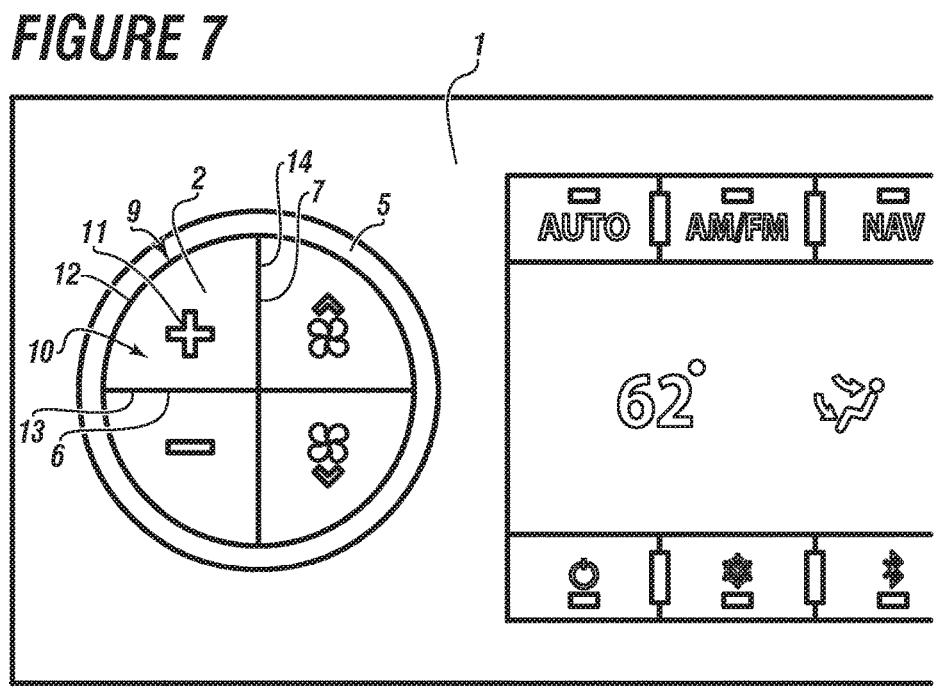
FIG. 7 shows a view of the vehicle controller after the restoration.

FIG. 7 is a view of a restored controller.

The vehicle controller 1 includes the controller 2, which includes the label 9 with the marked identifier 11 attached to the controller 2 instead of the previous faded identifier. The restoration method involves aligning the outer boundary 5 of the controller with the outer boundary 12 of the label, the inner horizontal boundary 6 of the controller with the inner horizontal boundary 13 of the label, and the inner vertical boundary 7 of the controller with the inner vertical boundary 14 of the label.

The front side of the label 9 can include the sheet of material 10.

The restored controller is indistinguishable in appearance from the original device such that the after-market alteration is not readily detectable or noticeable.

FIG. 8 depicts the steps of the method restoring a vehicle controller.

The restoration method for producing a restored vehicle controller can include scraping an indicia from a vehicle controller using a removal tool, shown in box 800.

The restoration method for producing a restored vehicle controller can include removing debris from a label-receiving surface of the vehicle controller, shown in box 802.

The restoration method for producing a restored vehicle controller can include smoothing the label-receiving surface utilizing an abrasive material, shown in box 804. The abrasive material may be sand paper, steel wool, or pumice stone.

The restoration method for producing a restored vehicle controller can include aligning a restoration apparatus with the label-receiving surface of the vehicle controller, shown in box 806.

The restoration method for producing a restored vehicle controller can include applying a substance to the label-receiving surface and applying pressure evenly to the restoration apparatus until the restoration apparatus has securely bonded to the vehicle controller, shown in box 808. The substance may be an alcohol-based sanitizer, a multi-surface cleaner, or ammonia.

In embodiments, the restoration apparatus forms a restored controller of the restored vehicle that is uniform and continuous in appearance and indistinguishable in appearance from the original automobile manufacturer identifiers providing visually similar illumination from the light source such that the alteration is not readily detectable or noticeable and prevents replacement of an entire control panel of the restored vehicle and eliminates chances for error or misalignment.

While these embodiments have been described with emphasis on the embodiments, it should be understood that within the scope of the appended claims, the embodiments might be practiced other than as specifically described herein.

What is claimed is:

1. A restoration method for producing a restored vehicle comprising:

a. scraping an indicia from a vehicle controller using a removal tool;

b. removing debris from a label-receiving surface of the vehicle controller;
c. smoothing the label-receiving surface utilizing an abrasive material;
d. aligning a restoration apparatus with the label-receiving surface of the vehicle controller, wherein the restoration apparatus comprises:
   (i) a sheet of material, wherein the sheet of material is made of material selected from the group consisting of: paper, plastic, and vinyl and mimics a look of an original vehicle controller and addresses fading and disappearance of original automobile manufacturer identifiers on the vehicle controller;
   (ii) an adhesive disposed on a side of the sheet of material, wherein the adhesive resists damage from light, temperature, and humidity; and
   (iii) an identifier formed on an opposite side of the sheet of material from the side having the adhesive, the identifier identical in shape, size, and color and providing light from a light source behind the vehicle controller that mimics the look of the original vehicle controller; and
e. securing the restoration apparatus to the vehicle controller; and
wherein the restoration apparatus forms a restored controller of the restored vehicle that is uniform and continuous in appearance and indistinguishable in appearance from the original automobile manufacturer identifiers providing visually similar illumination from the light source such that the alteration is not readily detectable or noticeable and prevents replacement of an entire control panel of the restored vehicle and eliminates chances for error or misalignment.

2. The restoration method of claim 1, wherein the removal tool is selected from the group consisting of: a sculpting knife, scissors, and a dull knife.

3. The restoration method of claim 1, wherein the abrasive material is selected from the group consisting of: sand paper, steel wool, and pumice stone.

4. The restoration method of claim 1, further comprising applying a substance to the label-receiving surface and applying pressure evenly to the restoration apparatus until the restoration apparatus has securely bonded to the vehicle controller.

5. The restoration method of claim 4, wherein the substance is selected from the group consisting of: an alcohol-based sanitizer, a multi-surface cleaner, and ammonia.

* * * * *